Figure 1:
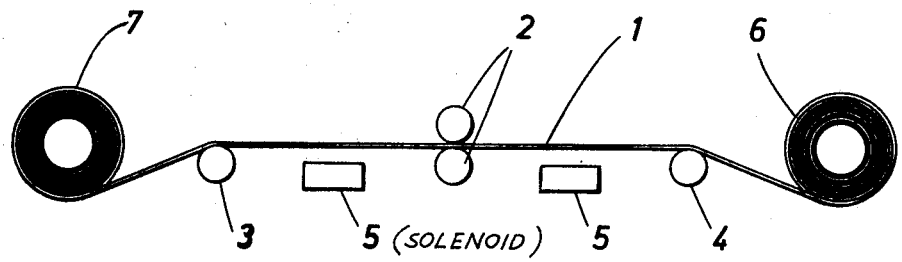

United States Patent [19]
Weinzinger et al.

[11] 3,969,668
[45] July 13, 1976

[54] METHOD FOR CHECKING THE PLANARITY OF A COLD-ROLLED FERROMAGNETIC STRIP

[75] Inventors: Hans Weinzinger; Bruno Hopf; Gunter Rigler, all of Linz, Austria

[73] Assignee: Vereinigte Osterreichische Eisen- und Stahlwerke-Alpine Montan Aktiengesellschaft, Linz, Austria

[22] Filed: Dec. 23, 1974

[21] Appl. No.: 535,363

[30] Foreign Application Priority Data
Jan. 15, 1974 Austria .................................. 289/74

[52] U.S. Cl. ................................. 324/34 R; 72/10
[51] Int. Cl.² .......................................... G01R 33/12
[58] Field of Search ........... 324/34 R, 34 ST; 72/10, 72/11, 12, 16, 8; 73/159

[56] References Cited
UNITED STATES PATENTS

| | | | |
|---|---|---|---|
| 3,499,306 | 3/1970 | Pearson | 73/159 |
| 3,502,968 | 3/1970 | Tobin, Jr. et al. | 324/40 |
| 3,619,769 | 11/1971 | Kusenberger | 324/37 |
| 3,756,050 | 9/1973 | Kubo et al. | 72/12 |
| 3,850,031 | 11/1974 | Schwenzfeier | 73/159 |

FOREIGN PATENTS OR APPLICATIONS

2,083,038  10/1971  France .................................. 73/159

*Primary Examiner*—Robert J. Corcoran
*Attorney, Agent, or Firm*—Kurt Kelman

[57] ABSTRACT

The strip is pulled in its longitudinal direction over two parallel supports, which extend transversely to and are spaced apart in said longitudinal direction. Said strip is subjected between said supports to magnetic forces which are approximately at right angles to the surface of said strip and are exerted by a plurality of solenoids, which are distributed across and clear of the strip and which comprise exciter windings fed with a predetermined alternating current, whereby a local deflection is produced in the strip adjacent to each of said solenoids, which deflections differ in a non-planar strip, in which the tensile stress differs across the strip. The voltage is sensed across each exciter winding during an interval of time shorter than one-half the period of the voltage and including a crossover of the alternating current. Values related to said local deflections are derived from the voltages across the exciter windings of said solenoids.

6 Claims, 12 Drawing Figures

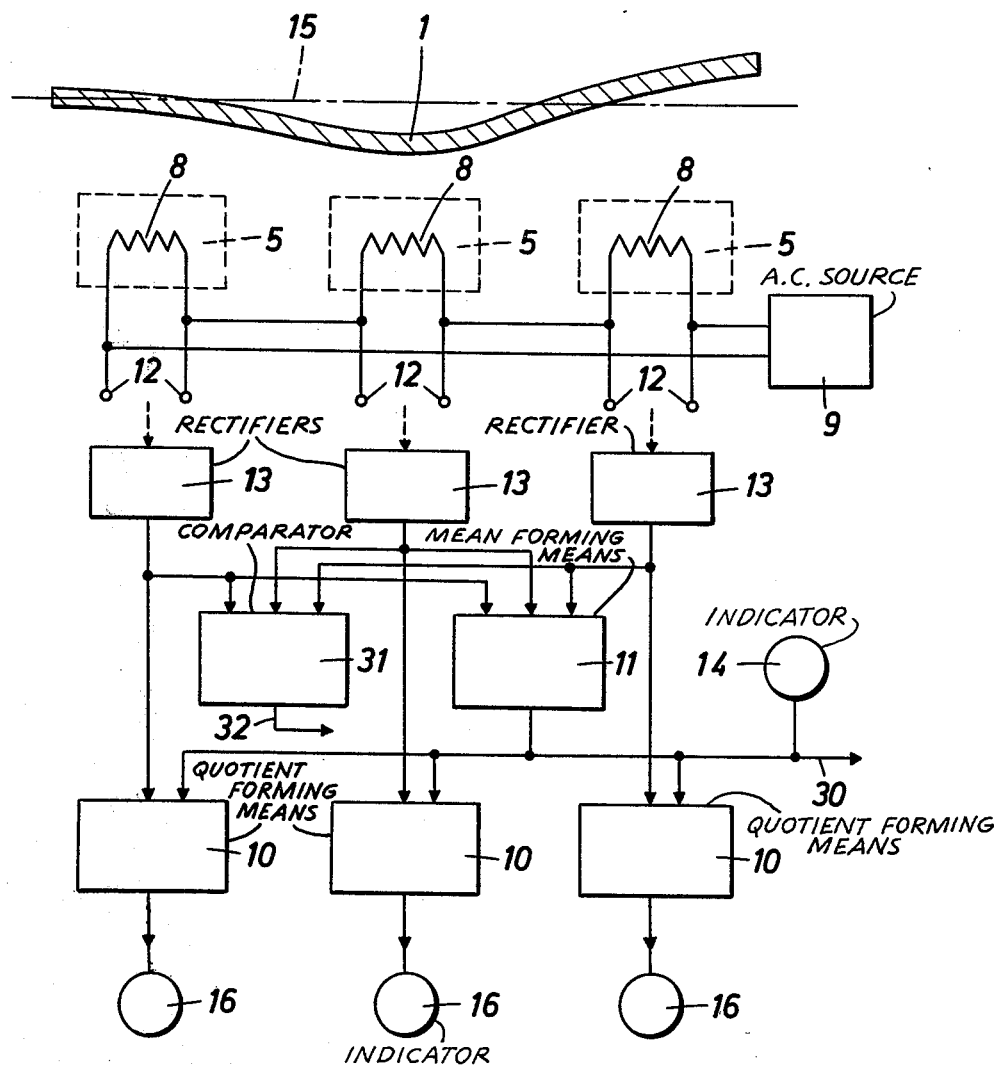

METHOD FOR CHECKING THE PLANARITY OF A COLD-ROLLED FERROMAGNETIC STRIP

This invention relates to a method of checking the planarity of cold-rolled ferromagnetic strip, in which the strip is pulled over two parallel supports, which are spaced apart and extend transversely to the longitudinal direction of the strip, the strip is subjected between the supports to magnetic forces which are approximately at right angles to the surface of the strip and are exerted by solenoids which are distributed across and clear of the strip, and the deflections of the strip caused by said magnetic forces are measured, which deflections differ with non-planar strips because the tensile stresses differ in such case across the width of the strip.

If inevitable variations of the thickness of the strip across the width thereof are eliminated as the strip is cold-rolled, the strip will become non-planar because the thicker portions of the strip will be stretched to a larger extend than the thinner portions and the different lengths of different longitudinal zones of the strip will give rise to undulations. To check the planarity of a strip, the same can be pulled over two spaced apart, parallel supports, which extend transversely to the longitudinal direction of the strip so that the sag between the two supports will vary in dependence on different lengths of the longitudinal zones of the strip, and the degree of planarity can be determined by a measurement of such sag, provided that the variation of the sag is so large that it can be measured. For this purpose the surface of the strip is subjected to forces which deflect respective longitudinal zones of the strip. In that practice, an exact knowledge of the distribution of forces across the strip is of high significance because the deflection of a longitudinal zone of the strip depends on the force which acts on said zone.

In a known method, the longitudinal zones of the strip are deflected by a compressed gas, which is fed to nozzles, which are directed toward the surface of the strip and evenly spaced across the strip. The deflection of the respective longitudinal zones of the strip is measured through an air gap by magnetic means which are clear of the strip. That known method has mainly the disadvantage that the gas pressure applied to the strip cannot be evenly distributed across the width of the strip. When the strip is substantially deflected in one longitudinal zone, the distance of said zone from the nozzles will be increased and the gas pressure applied to said longitudinal zone of the strip will be reduced and with it the deflection. Besides, the supply of a compressed gas involves a high expenditure, and disadvantage reside in the unpleasant noise produced by the nozzles and in the possibility that the nozzles may become clogged. In another known method, the strip is deflected by means of a solenoid and the extent of the deflection in each longitudinal zone of the strip is measured by sensing heads, which are movable toward the surface of the strip. In that method, a gas is conducted through the sensing heads and directed to the surface of the strip to produce a dynamic pressure, which ensures a constant spacing between the sensing heads and the surface of the strip. That method involves a relatively high expenditure as well as the risk of a soiling of the sensing heads. Such soiling will directly affect the accuracy of the measurements. Because the sensing heads cannot be protected against being soiled, that known method apparently cannot be used in the rough practice of rolling mills.

It is an object of the invention so to improve a method which is of the kind described first hereinbefore that a reliable and trouble-free checking of the planarity of a cold-rolled strip is enabled with simple means and in such a manner that any dirt which is present or any vibration of the entire strip will not adversely affect the result of measurement.

This object is accomplished according to the invention in that the exciter windings of the solenoids are fed with a predetermined alternating current and the voltages across said exciter windings are detected as a measure of the deflections. The different deflections correspond to air gaps having different widths and the widths of said air gaps influence the voltage across the exciter windings. For this reason the voltage across the exciter winding of each solenoid may be used as a measure of the deflection of the associated longitudinal zone of the strip. As a result, there is no need for a separate measuring system and the non-contacting solenoids can be perfectly protected from being soiled and from the rolling oil emulsion.

According to a further feature of the method according to the invention the ratio of the voltage across each exciter winding to the arithmetic mean or sum of the voltages across all exciter windings is computed and indicated. This practice has the important advantage that the mean distance of the several longitudinal zones of the strip from the solenoids does not enter the measurement but the deflections of the several longitudinal zones with reference to said mean distance are detected. These deflections directly reflect the degree of planarity of the strip. The measurement will not be affected by any vibration which is imparted to the strip as a whole and which changes the mean distance of the strip from the solenoids.

According to another feature of the invention, the solenoids are moved further away from the strip when the voltage across at least one exciter winding exceeds a limit. This feature prevents in a simple manner a contact of the solenoids with the strip. When the voltage across an exciter winding rises above the limit, this means that the distance between the surface of the strip and the solenoid, i.e., the air gap associated with the solenoid, has decreased below a certain magnitude. To prevent a contact between this solenoid and the strip, at least said solenoid must be moved further away from the strip.

Because the voltage across each exciter winding depends also on the magnetic flux in the strip, there will be a non-linear distortion of the voltages when the air gap is small and the saturation range has been reached. The sensitivity of the measurement should not be affected by such conditions. For this purpose the voltages across the several exciter windings are measured only within intervals of time which are shorter than one-half of the period of the voltage and which include a crossover of the exciting current. The voltages are measured only when there is an approximately linear relation between the field intensity and the induction or flux.

To enable a measurement of both positive and negative half waves of the voltage, it is another feature of the invention to rectify the voltage across each exciter winding before said voltages are evaluated.

The differences between the deflections of the several longitudinal zones of the strip should be sufficiently large for a satisfactory measurement. For this reason the distance between the supports, the thickness of the strip and tensile stress acting on the strip in its longitudinal direction must be taken into consideration in the selection of the forces which act on the strip at right angles to its surface. An adaptation to different conditions will be enabled if, in accordance with the invention, the deflecting force exerted by each solenoid can be increased by an additional excitation, which is preferably effected with direct current.

An apparatus for carrying out the invention comprises solenoids which are disposed approximately midway between the supports and distributed across the strip and is characterized in that each solenoid has associated with it separate quotient-forming means, and the voltage across the exciter winding of the associated solenoid and the output of means or computing the sum or mean of the voltages across the exciter windings of all solenoids are connected to respective inputs of said quotient-forming means. Owing to the provision of quotient-forming means and sum- or mean-forming means, the voltages across the exciter windings of the several solenoids can be referred to the mean of the voltages associated with all solenoids so that fluctuations of the mean voltage will not affect the result of the measurement.

According to the invention all solenoids are mounted on a common carrier, which is parallel to the surface of the strip and is adjustable at right angles to the surface of the strip. This arrangement permits of adjusting the solenoids in unison to the correct operative position in a simple manner. For the adjustment of the carrier, drive means may be provided, which are connected to a controller, which in response to a predetermined maximum voltage across the exciter windings moves the carrier further away from the strip. In such an arrangement, the carrier and the solenoids will be moved further away from the strip before the latter contacts the solenoids. As a result, the strip cannot damage the solenoids.

A mean distance between the solenoids and the surface of the strip should be maintained even in case of a change of the sag of the strip in order to enable a measurement with a predetermined sensitivity. For this purpose it is a further feature of the invention that the controller controls the distance from the carrier to the strip in dependence on the mean or sum of the voltages across the several exciter windings. The mean voltage and the sum of the voltages have the same information content.

To enable a checking of strips differing in width, it is a feature of the invention that the solenoids are adjustable on the carrier transversely to the longitudinal direction of the strip. In that case it will be an advantage to provide adjusting means which ensure that the solenoids will always be evenly spaced apart because in that case the forces exerted on the strip will be uniformly distributed across the strip.

In accordance with another feature of the invention, each solenoid comprises an additional winding, which is preferably fed with direct current. In such case the deflecting force can be much increased without need for a change of the measuring system.

According to a further feature of the invention, the voltage across each exciter winding can be rectified by a full-wave rectifier so that the positive and negative voltage half-waves can be measured.

Figure 2:
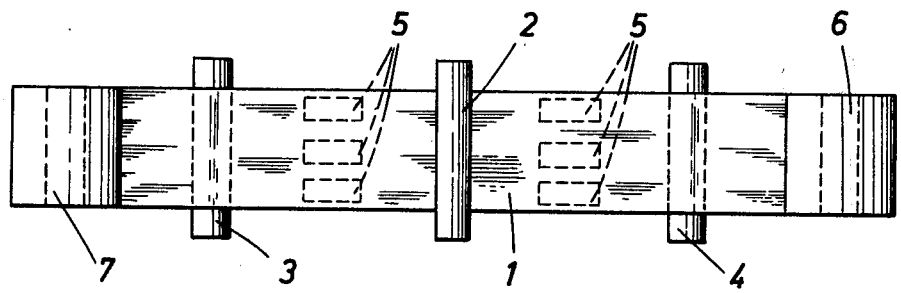
Figure 4:
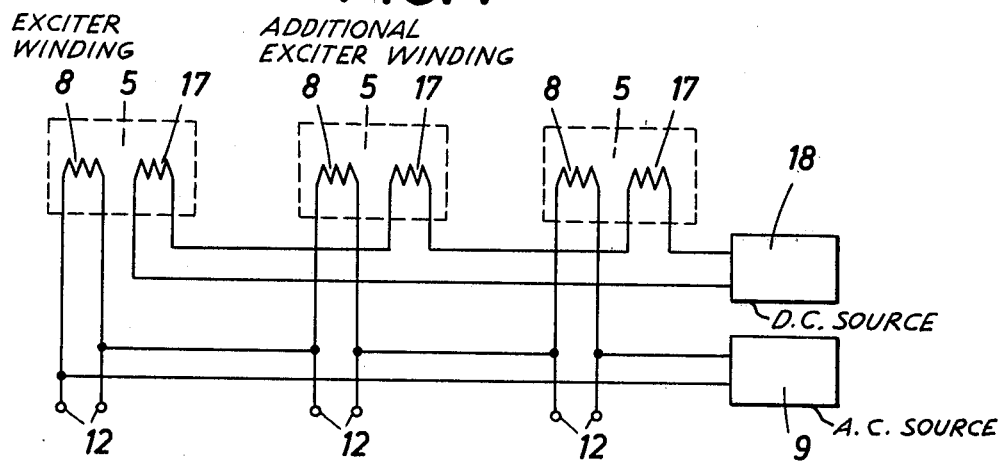
Figure 5:
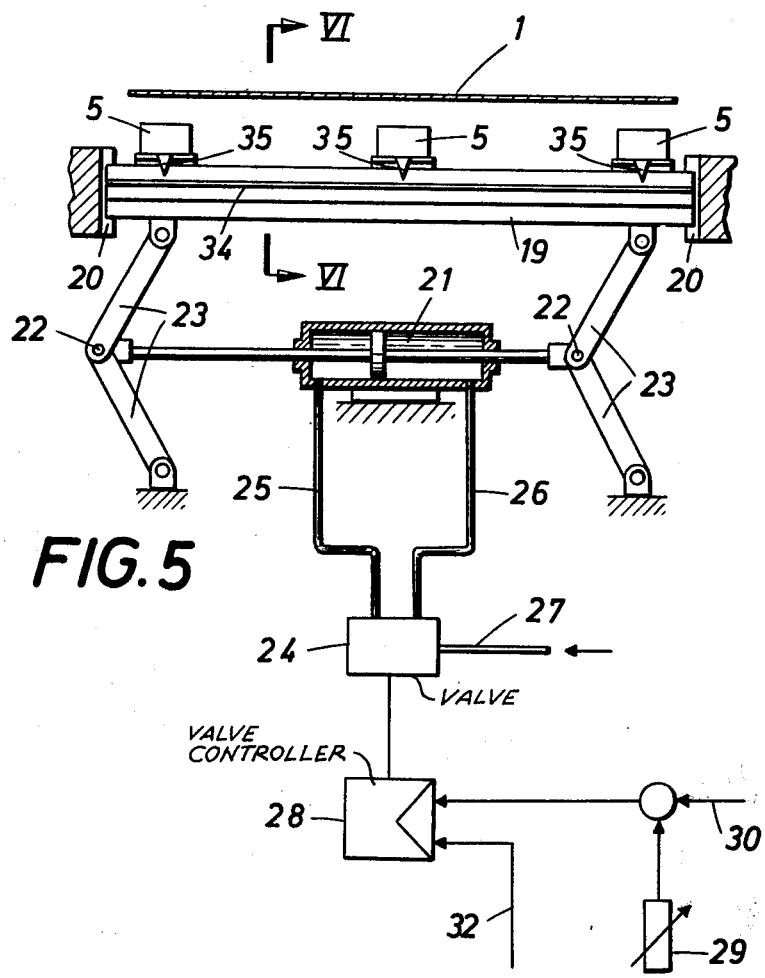
Figure 6:
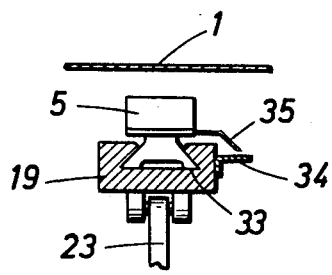
Figure 7:
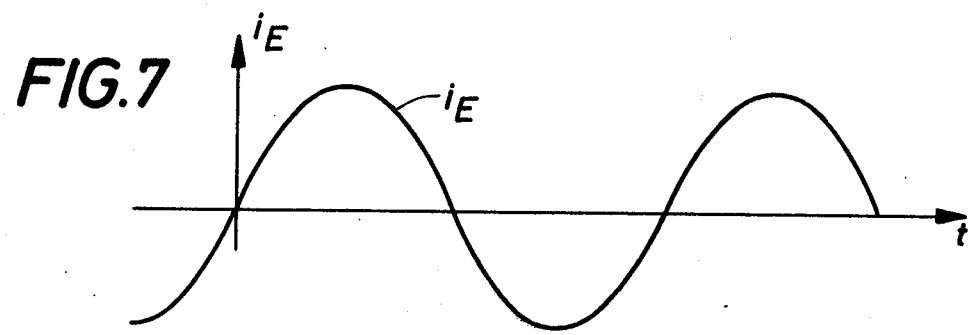
Figure 8:
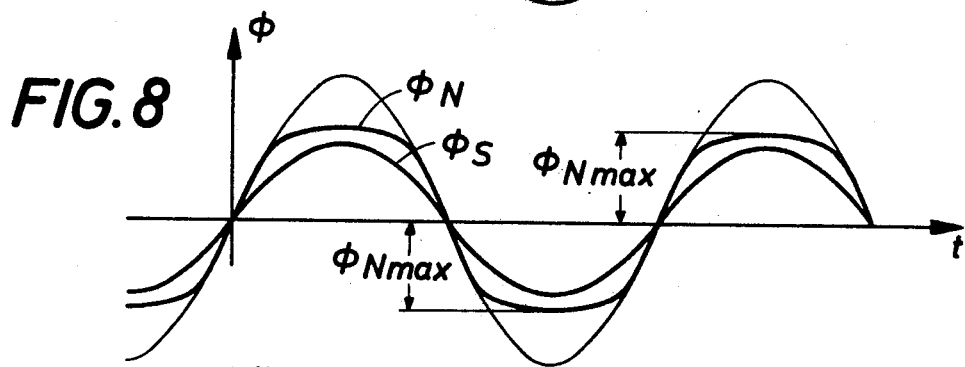
Figure 9:
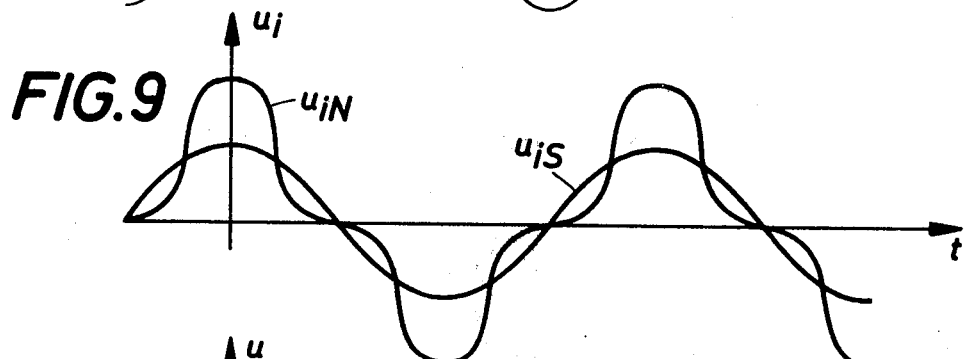
Figure 10:
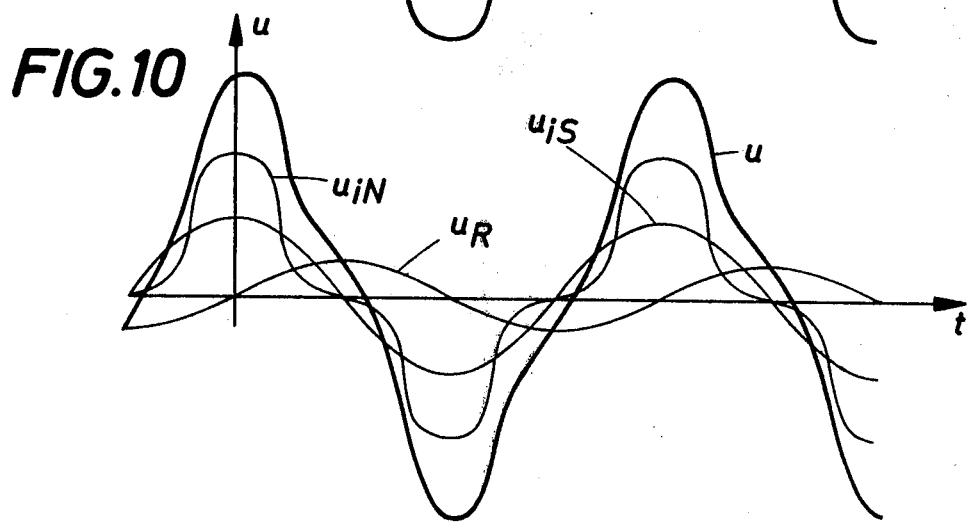

The method according to the invention will be explained more fully with reference to apparatus shown on the accompanying drawings, in which FIGS. 1 and 2 are, respectively, a diagrammatic side elevation and a top plan view showing apparatus according to the invention, FIG. 3 is a block circuit diagram showing the measuring system, FIG. 4 is an electric circuit diagram showing solenoids provided with an additional d.c. exciter winding, FIG. 5 is a diagrammatic transverse sectional view showing apparatus according to the invention comprising solenoids which are adjustable at right angles to the surface of the strip, FIG. 6 is a sectional view taken on line VI—VI in FIG. 5, FIG. 7 shows the waveform of the exciting current of a solenoid, FIG. 8 a waveform of the magnetic flux in case of an air gap having a given width, FIG. 9 the voltage induced in the exciter winding by said flux, FIG. 10 the waveform of the actual voltage across the exciter winding, FIG. 11 the waveform of the actual voltage across said exciter windings and measuring intervals, and FIG. 12 a block circuit diagram of means for making such timed measurements.

An apparatus according to FIGS. 1 and 2 serves to check the planarity of a strip 1 before and behind a pair of working rolls 2. For each of these checks, the strip is pulled over two supports, which are formed by a deflecting roller 3 and the working rolls 2 and by the working rolls 2 and a deflecting roller 4. Approximately midway between these supports 3 and 2, 2 and 4, solenoids are provided which are distributed across the strip. Whereas it will usually be sufficient to provide three solenoids 5 distributed across the strip, as is shown in the drawing, it will be understood that the number of solenoids may be altered as required.

In the drawing, two checking stations (between the deflecting roller 3 and the working rolls 2 and between the working rolls 2 and the deflecting roller 4) are shown. It will be understood, that only one checking station may be provided, e.g., between the working rollers 2 and the deflecting roller 4.

By means of an upcoiler 6, the strip 1 is pulled from an uncoiler 7 with a constant tensile force. As a result, the strip is tensioned between the supports 3 and 2, 2 and 4. The solenoids 5 exert deflecting forces which are normal to said tensile force and cause the strip to sag. The sag is not uniform throughout the width of the strip if the latter is non-planar. Longitudinal zones which differ in length in the relaxed strip will be subjected to different tensile stresses when the strip is longitudinally tensioned. When the deflecting force is evenly distributed across the strip, the resulting deflections will differ in dependence on these different tensile stresses. According to the invention, the different deflections of the several longitudinal zones of the strip may be detected by a measurement of the voltages which are induced in the exciter windings 8 if the latter are fed with a predetermined exciting alternating current. For this reason, the series-connected exciter windings 8 of the several solenoids 5 are connected to an a.c. source 9, as is shown in FIG. 3. The voltage across the exciter windings 8 depends on the magnetic flux, which passes partly through air and partly through the ferromagnetic strip 1. If the air gap is so large that there is a linear relation between the field intensity and that part of the flux which passes through the strip, the voltage induced in the exciter windings 8 will be inversely proportional to the size of the air gap. For this reason, at least outside the saturation range the voltage across the exciter windings 8 may be directly taken as a measure of the distance of the respective solenoids 5 from the respective longitudinal zone of the strip.

Because the planarity of the strip is not reflected by the distance of the solenoids 5 from the surface of the strip but by the differences between these distances at the several solenoids, it is a feature of the invention that the distances measured at the several longitudinal zones are not directly utilized but are referred to a mean distance. For this purpose, each solenoid 5 has associated with it quotient-forming means 10, and the indicator across the exciter winding of the associated solenoid 5 and the output of mean-forming means 11 for the voltages across the exciter windings 8 of all solenoids 5 are applied to respective inputs of the quotient-forming means. The voltage at the terminals 12 of each exciter winding is applied to the associated quotient-forming means 10 and to the mean-forming means 11. The terminals 12 of each winding are connected to a full-wave rectifier 13, which permits of a detection of the negative and positive half-waves. The voltage at the output of the mean-forming means 11 is displayed by an indictor 14 and corresponds to the mean distance of the solenoids 5 from the surface of the strip. This voltage would be present at the terminal 12 of each exciter winding 8 if the strip were planar and in the position indicated by the dash-dot line 15. The quotient-forming means 10 compute the ratio of the actual voltage at the terminals 12 to the mean of the voltages across all exciter windings 8 so that the deviations of the actual position of the strip from the desired position indicated by the line 15 can be read from indicators 16, which succeed the quotient-forming means. It will be understood that the output values of the quotient-forming means 10 may be used to control roll-bending devices, which then correct the rolling operation.

Instead of the mean-forming means 11, sumforming means may be used because the arithmetic mean is directly proportional to the sum.

As the distances of the several solenoids 5 from the surface of the strip are not used to indicate the degree of planarity but the ratios of such distances to a mean strip distance, are used for this purpose, any changes of the mean distance will influence only the sensitivity but will not enter the measurement itself. For instance, a vibration of the strip cannot influence the result of the measurement.

Only sufficiently large departures of the strip from the desired position represented by the line 15 can be detected satisfactorily. Because the deflections of the strip 1 depend on the distance between the supports for the tensioned strip, the thickness of the strip, and the deflecting force either the distance between the supports or the magnitude of the deflecting force can be changed for an adaptation to a strip having a given thickness. The distance between the supports is usually fixed so that the deflection of a strip having a given thickness can be influenced only by the deflecting magnetic forces. When the exciting current in the exciter windings 8 is changed for this purpose, the voltage induced in the exciter windings will be changed too. This may give rise to difficulties in the succeeding electric devices. A more favorable arrangement is indicated in FIG. 4 and comprises solenoids 5 which are provided with additional exciter windings 17, which are connected in series to a d.c. source 18. D.c. magnetization has the advantage that it does not influence the voltages induced in the exciter windings 8.

The sensitivity of the measurement depends on the magnitude of the deflection of the strip in each longitudinal zone of the strip and on the size of the air gap a simple adjustment of an air gap to a size which is suitable under given conditions is shown in FIG. 5. The solenoids 5 are secured to a common carrier 19, which can be adjusted in guides 20 at right angles to the surface of the strip. The means for adjusting the carrier 19 comprise a double-acting hydraulic actuator 21, which is connected to the central hinges 22 of toggle joints 23. The application of pressure to the hydraulic actuator 21 is controlled by a valve 24, which delivers pressure fluid through pressure conduits 25 and 26 to one end of the hydraulic actuator 21 or the other so that the piston of the hydraulic actuator is moved to one side of the other and adjusts the toggle joints 23 accordingly. Pressure fluid is supplied to the control valve 24 in a conduit 27.

The control valve 24 is operated by a controller 28 in such a manner that a constant mean distance of the surface of the strip from the solenoids 5 is maintained. This mean distance can be adjusted by a set point-setting device 29. The voltage which is set by the set point-setting device 29 corresponds to the desired mean distance and is compared to the output voltage of the mean-forming means 11. Said output voltage corresponds to the actual mean distance. A lead 30 connects the mean-forming means 11 to the controller. If the actual value differs from the desired value, the controller 28 will actuate the valve 24 so that the hydraulic actuator 21 shifts the carrier 19 until the actual value again corresponds to the desired value.

Even if the strip 1 has large undulations, it should not contact and damage one of the solenoids 5. For this reason the voltages across the terminals 12 of each exciter winding are compared in a device 31 with an adjustable predetermined limiting value. When the voltage across the terminals of an exciter winding exceeds the limiting value, a signal is delivered in a line 32 to the controller 28, which then lowers the carrier 19 to its lowermost position.

As is shown in FIGS. 5 and 6, the apparatus can be adjusted to the width of the respective strip by a displacement of the individual solenoids 5. In the embodiment shown by way of example the carrier 19 is provided for this purpose with a dovetail groove 33, in which the solenoids 5 are suitably mounted. Because an exact check of the planarity of a strip depends on the uniformity of the distribution of the deflecting force across the strip, the solenoids 5 must be evenly spaced apart. A uniform distribution of the solenoids 5 can be enabled in a simple manner if a length scale 34 is provided, which is secured to the carrier 19 and from which the position of the several solenoids 5 are readable at indicating tongues 35, which are secured to the solenoids.

When the exciter windings 8 are fed with a sinusoidal exciting current $i_E$ (FIG. 7), a magnetic flux will be produced which passes partly through air and partly through the ferromagnetic strip. That part of the flux which passes through air cannot be used in the determination of the distance of the respective solenoid from the surface of the strip and for this reason will be referred to as leakage $\phi_S$ hereinafter. Only that portion of the flux which passes through the ferromagnetic strip can be used to detect the size of the air gap and for this reason will be referred to as useful flux $\phi_N$. In case of a sinusoidal exciting current $i_E$, the leakage flux $\phi_S$ has also a sinusoidal waveform whereas the waveform of the useflux flux $\phi_N$ will differ from a sinusoidal waveform if the magnetic field intensity is in the saturation range of the ferromagnetic strip. FIG. 8 shows the waveform of a useful flux which is produced by an exciter current $i_E$ as shown in FIG. 7 in case of a given thickness of the strip and a given size of the air gap. With thicker strips 1, a higher field intensity is required for saturation so that the maximum useful flux $\phi_{Nmax}$ is larger than with thinner strips. The ratio of the leakage flux to the useful flux will depend on the size of the air gap. The smaller the air gap, the smaller will be the proportion of leakage flux and the larger will be the proportion of useful flux so that the useful flux reaches the saturation range sooner than with larger air gaps.

The voltages $u_i$ induced in the exciter windings 8 depend on the rate of change of the magnetic flux $\phi$. In case of a small air gap, the useful flux $\phi_N$ changes rapidly so that the voltage $u_{iN}$ induced by it is higher than with a larger air gap, where the useful flux is smaller and changes more slowly the frequency or period is constant as it depends on the exciting current $i_E$. FIG. 9 shows the waveform of the voltages $u_{iN}$ and $u_{iS}$ which are induced in the exciter winding 8 by the useful flux $\phi_N$ and the leakage flux $\phi_S$. If the air gap changes and is, e.g. increased, this will result in a leakage flux $\phi_S$ having a smaller amplitude and a larger useful flux $\phi_N$ so that the waveform of the leakage flux will have flatter slopes and the waveform of the useful flux will have steeper slopes. The voltage $u_{iS}$ induced by the leakage flux will have a sinusoidal waveform and a smaller amplitude whereas the rapid change of the useful flux $\phi_N$ will result in steeper voltage peaks, which will be of shorter duration because the flux reaches saturation sooner. The voltage $u$ which appears at the terminals is composed of the voltage $u_{iN}$, which is induced by the useful flux $\phi_N$, the voltage $u_{iS}$, which is induced by the leakage flux $\phi_S$, and the resistive voltage drop $u_R$ across the respective exciter windings 8. It is apparent that the voltage $u$ which can be measured at the terminals 12 is not inversely proportional to the air gap throughout the waveform of that voltage. An approximately linear relation between the terminal voltage $u$ and the air gap exists only when there is a linear relation between the magnetic field intensity and the flux and when there are no saturation phenomena. To ensure a high sensitivity also in measurements in which the saturation phenomena are not negligible, the voltage is measured only during part of the period rather than during the entire period. As is shown in FIG. 11, the terminal voltages are desirably measured only during intervals of time which are shorter than onehalf of the period of the voltage waveform and which include a crossover of the exciter current $i_E$. At the crossover of the exciting current $i_E$, there is a linear relation between the field intensity and the induction or flux because the field intensity which is proportional to the exciting current is not yet high.

Figure 11:
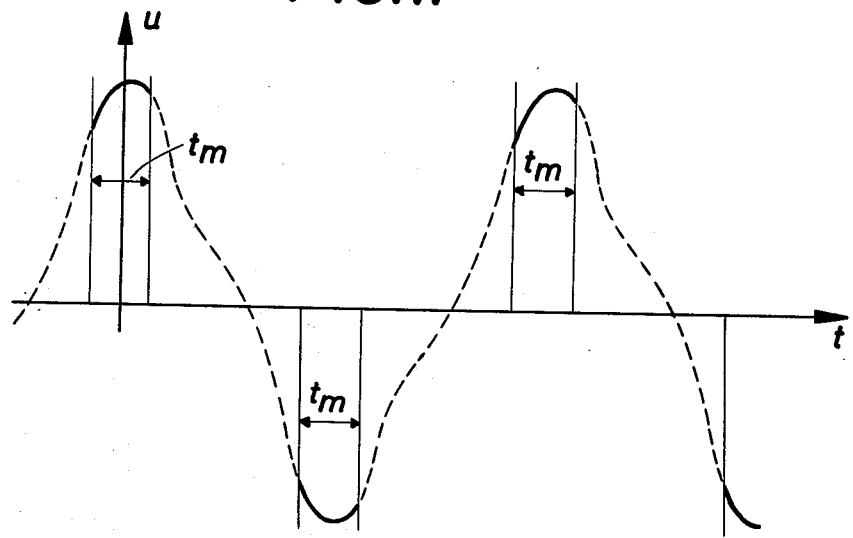

The measuring intervals are designated $t_m$ in FIG. 11.

Figure 12:
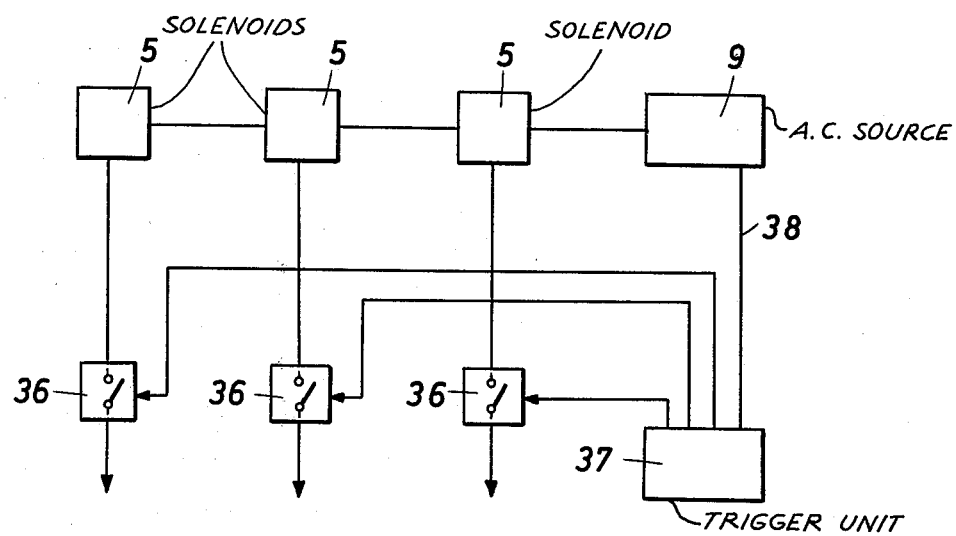

FIG. 12 illustrates in a block circuit diagram how it is ensured that the measurement is taken only in the time intervals $t_m$. The voltages across the exciter windings of the several solenoids 5 are sampled by switches 36, which are controlled by a trigger unit 37. The trigger unit 37 is connected by a lead 38 to the source of exciting current 9 and is synchronized thereby so that the switches 36 are operated exactly at the frequency of the exciting current and each intervals of time $t_m$ in which the switches 36 are closed includes a crossover of the exciting current.

The effective air gap might be changed by any ferromagnetic particles which have been attracted by the solenoids 5. This may be prevented, e.g., by the provision blast nozzles which blow off such particles.

Besides, provision could be made to vary the exciting current $i_E$ so that the natural frequency of the strips can be taken into consideration in selecting the frequency so as to avoid resonant vibration.

What is claimed is:

1. A method of checking the planarity of a cold-rolled ferromagnetic strip, which comprises pulling the strip in its longitudinal direction over two parallel supports which extend transversely to and are spaced apart in said longitudinal direction, subjecting said strip between said supports to magnetic forces which are approximately at right angles to the surface of said strip and are exerted by a plurality of solenoids distributed across and clear of the strip and which comprise exciter windings fed with a predetermined alternating current, whereby a local deflection is produced in the strip adjacent each of said solenoids, which deflections differ in a non-planar strip, in which the tensile stress differs across the strip, sensing the voltage across each of said exciter windings during an interval of time which is shorter than one-half of a period of said voltage and which includes a crossover of said alternating current, and deriving the values which are related to said local deflections from the voltages across the exciter windings of said solenoids.

2. A method as set forth in claim 1, which comprises continually computing and indicating the ratio of the voltage across each of said exciter windings to the arithmetic mean of the voltages across all of said exciter windings.

3. A method as set forth in claim 1, which comprises continually computing and indicating the ratio of the voltage across each of said exciter windings and the sum of the voltages across all of said exciter windings.

4. A method as set forth in claim 1, in which the solenoids are moved away from the strip when the voltage across at least one of said exciter windings exceeds a predetermined upper limit.

5. A method as set forth in claim 1, which comprises rectifying the voltage across each of said exciter windings.

6. A method as set forth in claim 1, in which the magnetic force exerted by each solenoid is produced by said alternating current flowing through exciter winding thereof and by an additional exciter winding fed by direct current.

* * * * *